US007907565B2

(12) United States Patent
Van de Groenendaal et al.

(10) Patent No.: US 7,907,565 B2
(45) Date of Patent: Mar. 15, 2011

(54) SYSTEM AND METHOD FOR MANAGING WIRELESS DEVICES IN AN ENTERPRISE

(75) Inventors: Johan Van de Groenendaal, Marlborough, MA (US); Michael Fry, Cincinnati, OH (US); Sandeep Jain, Islandia, NY (US); Andrzej Zalewski, Vallingby (SE); Ralf Saborowski, Leichlingen (DE); Davanum Srinivas, Sharon, MA (US)

(73) Assignee: Computer Associates Think, Inc., Islandia, NY (US)

( * ) Notice: Subject to any disclaimer, the term of this patent is extended or adjusted under 35 U.S.C. 154(b) by 2057 days.

(21) Appl. No.: 10/420,022

(22) Filed: Apr. 21, 2003

(65) Prior Publication Data
US 2004/0005873 A1 Jan. 8, 2004

Related U.S. Application Data

(60) Provisional application No. 60/373,787, filed on Apr. 19, 2002.

(51) Int. Cl.
*H04W 4/00* (2009.01)
(52) U.S. Cl. .......... 370/329; 370/338; 370/341
(58) Field of Classification Search .......... 370/328, 370/331, 332, 338, 311, 252, 310.1, 333
See application file for complete search history.

(56) References Cited

U.S. PATENT DOCUMENTS

| | | | | |
|---|---|---|---|---|
| 5,758,359 A * | 5/1998 | Saxon | ........... | 707/204 |
| 5,903,548 A * | 5/1999 | Delamater | .......... | 370/310 |
| 6,091,951 A * | 7/2000 | Sturniolo et al. | ......... | 455/432.2 |
| 6,744,753 B2 * | 6/2004 | Heinonen et al. | ............ | 370/338 |
| 6,816,905 B1 * | 11/2004 | Sheets et al. | ........... | 709/226 |
| 6,842,861 B1 * | 1/2005 | Cox et al. | .......... | 713/188 |
| 2001/0007818 A1 | 7/2001 | Ichikawa | ............ | 455/425 |
| 2002/0022453 A1 * | 2/2002 | Balog et al. | ............ | 455/41 |
| 2002/0062472 A1 * | 5/2002 | Medlock et al. | .......... | 716/1 |
| 2003/0041125 A1 * | 2/2003 | Salomon | ............ | 709/220 |
| 2003/0142641 A1 * | 7/2003 | Sumner et al. | ............ | 370/328 |
| 2003/0169710 A1 * | 9/2003 | Fan et al. | ............ | 370/338 |
| 2003/0177397 A1 * | 9/2003 | Samman | ............ | 713/201 |
| 2003/0191957 A1 * | 10/2003 | Hypponen et al. | ............ | 713/200 |
| 2004/0170190 A1 * | 9/2004 | Hamlin | ............ | 370/466 |
| 2005/0091111 A1 * | 4/2005 | Green et al. | ............ | 705/14 |
| 2005/0227732 A1 * | 10/2005 | Hiraki | ............ | 455/561 |

FOREIGN PATENT DOCUMENTS

DE     198 54 177 A1    5/2000

(Continued)

OTHER PUBLICATIONS

EPO Partial Supplementary European Search Report Under Rule 46(1) EPC; Application No. 03718482.7-2416; Reference No. HDC/J00047081EP; 6 pages, Aug. 13, 2007.

(Continued)

*Primary Examiner* — Chi H Pham
*Assistant Examiner* — Soon-Dong D Hyun
(74) *Attorney, Agent, or Firm* — Baker Botts L.L.P.

(57) ABSTRACT

Methods and systems are disclosed for managing wireless devices in an enterprise. A first exemplary method manages the physical access points of a wireless network in an enterprise. A second exemplary method manages the assets of wireless devices in an enterprise. A third exemplary method enables virus detection within wireless devices. A fourth exemplary method manages wireless device data backup.

17 Claims, 7 Drawing Sheets

FOREIGN PATENT DOCUMENTS

| | | |
|---|---|---|
| EP | 1 081 895 A1 | 3/2001 |
| WO | WO 01/41485 A1 | 6/2001 |

OTHER PUBLICATIONS

Anonymous: "Airwave Rogue Access Point Detection"; Internet Citation [Online] 2002, XP002319028; retrieved from Internet: URL:http://web.archive.org/web/20030406162630/www.airwave.com/marketing_docs/airwave_rogue_detection.pdf> , Feb. 24, 2005.

"IBM Research Demonstrates Industry's First Auditing Tool for Wireless Network Security"; Internet Citation, [Online]; XP002263357; retrieved from the Internet: URL:http://www.research.ibm.com/resources/news/20010712_wireless.shtml> , Jul. 12, 2001.

Sumit Deshpande: "Enabling Mobile eBusiness Success"; Computer Associates; XP002287917, Apr. 22, 2002.

Rhonda R. Henning: "Vulnerability Assessment in Wireless Networks"; Applications and the Internet Workshops, 2003. Proceedings. 2003 Symposium on Jan. 27-31, 2003, Piscataway, NJ, USA, IEEE; XP010644214, Jan. 27, 2003.

EPO Communication pursuant to Article 94(3) EPC; Application No. 03 718 482.7-2416; Ref. HDC/J00047081EP, Jan. 12, 2009.

* cited by examiner

SYSTEM AND METHOD FOR MANAGING WIRELESS DEVICES IN AN ENTERPRISE

CROSS-REFERENCE TO RELATED APPLICATIONS

This application claims priority to U.S. Provisional Application entitled "Wireless Enterprise Management System and Method", Ser. No. 60/373,787, filed Apr. 19, 2002, which is hereby incorporated by reference in its entirety.

TECHNICAL FIELD

The described systems and methods are generally related to enterprise information processing environments. More specifically, the described systems and methods are related to managing wireless devices in an enterprise information processing environment.

BACKGROUND

In recent years, the use of mobile technologies has steadily increased for both business and personal uses. Mobile telephones are commonly used, and many people employ personal information management ("PIM") devices or palmtop computers to manage their schedule, contacts, financial information and other data. Such devices are particularly useful for employees whose job responsibilities require them to travel. Some businesses encourage such employees to periodically connect with their enterprise information processing environment through the wireless devices to increase responsiveness and productivity. The mobile periodic connections foster communication between employees and improve the timeliness of collected data through synchronization processes between the mobile devices and the enterprise.

The growing proliferation of wireless enabled personal digital assistants ("PDA's") mobile e-mail devices and notebook PC's has encouraged wireless carriers to offer transmission of not only voice, but also data signals to/from mobile wireless devices. While the integration of these wireless devices into an enterprise information processing environment promotes increased productivity and efficiency, such integration may also result in increased threats to security and privacy of the information stored within and transmitted to/from such mobile devices.

Businesses employing mobile wireless devices which may be connected to the enterprise expect certain benefits to flow from the use of such devices. Such benefits, for example, may include the ability for laptop computers to be wirelessly connected to enable work to be done from virtually anywhere. Another benefit of wireless connectivity is the flexible access to business processes. Yet another benefit of wireless connectivity is the ability to receive appropriate alerts and messages on the mobile device in order to carry out required job functions with improved efficiency.

In addition to the benefits of wireless connectivity, businesses employing connectable wireless devices face certain challenges. One of the challenges, for example, is the challenge to adequately protect the information on wireless devices to ensure that confidential business and personal information is not lost or stolen. Another challenge is the real-time synchronization of information to ensure accuracy and consistency.

In order to limit the security and privacy threats associated with the connection of mobile devices to the enterprise, some businesses operate two separate information processing environments: one for wired devices and a second for wireless devices. Businesses maintaining two distinct environments lose the benefits of integration and synchronization that may be enjoyed by those operating a combined environment.

A second prior art solution to the integration of wireless devices into an enterprise information processing environment is to run in a hybrid mode in which separate dedicated resources for both wired and wireless devices are maintained. Employing such separate resources in a combined environment often results in incompatibility between devices and/or weakened security.

Accordingly, a need exists for a system and method for managing wireless devices in an enterprise information processing environment that enables integration and synchronization of the wireless devices while protecting the security and privacy of the data on connected devices, whether wired or wireless.

SUMMARY

The following presents a simplified summary of systems and methods associated with managing wireless devices in an enterprise processing environment. This summary is not an extensive overview and is not intended to identify key or critical elements of the methods and/or systems or to delineate the scope of the methods and systems media. It conceptually identifies the methods and systems in a simplified form as a prelude to the more detailed description that is presented later.

In accordance with one aspect of the present application, an exemplary method is disclosed for managing a wireless device in a network. The method includes identifying a plurality of authorized logical wireless access points within a network. The method also includes detecting a plurality of physical wireless access points within the network, and determining, for each of the plurality of physical wireless access points, whether the physical wireless access point is associated with one of the plurality of authorized logical wireless access points. The method further includes reporting each physical wireless access point that is not associated with an authorized logical wireless access points.

In accordance with a second aspect of the present application, an exemplary method is disclosed for managing a wireless device in a network. The method includes defining a set of authorized assets associated with a wireless device on a network. The method also includes detecting the wireless device on the network, and determining the actual assets associated with the wireless device. The method further includes analyzing the set of authorized assets and the actual assets to identify at least one flagged asset. The method still further includes reporting the at least one flagged asset.

In accordance with a third aspect of the present application, an exemplary method is disclosed for managing a wireless device in a network. The method includes detecting a device on a network, and determining that the device is a wireless device. The method also includes determining that the device has received data from a computer. The method further includes executing a virus scanning routine associated with the wireless device.

In accordance with a fourth aspect of the present application, an exemplary method is disclosed for managing a wireless device in a network. The method includes defining a data backup policy associated with a wireless device in a network. The method also includes detecting the wireless device in the network, and analyzing the data backup policy to determine that data residing on the wireless device should be backed up. The method further includes backing up the data residing on the wireless device.

Certain illustrative aspects of the methods and systems are described herein in connection with the following description and the annexed drawings. These aspects are indicative, however, of but a few of the various ways in which the principles of the methods, systems, and media may be employed and thus the examples are intended to include such aspects and equivalents. Other advantages and novel features may become apparent from the following detailed description when considered in conjunction with the drawings.

BRIEF DESCRIPTION OF THE DRAWINGS

For a more complete understanding of the present methods and systems, reference is now made to the following description taken in conjunction with the accompanying drawings in which like reference numbers indicate like features and wherein.

DETAILED DESCRIPTION

Figure 1:
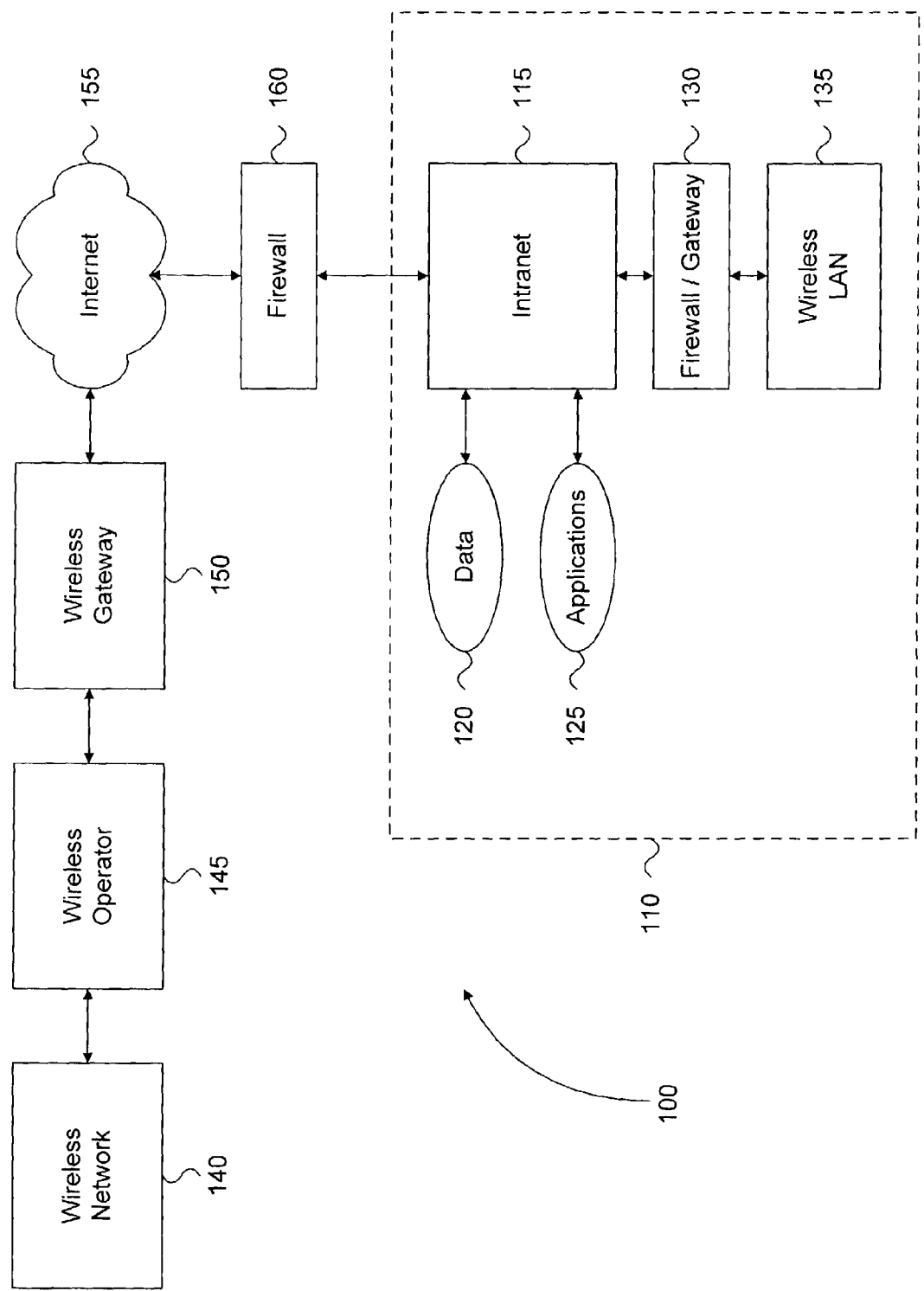
FIG. 1 is a block diagram illustrating an example enterprise information processing environment, in accordance with the systems and methods described in the present application.

Example methods and systems are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details. In other instances, well-known structures and devices are shown in block diagram form in order to simplify the description.

FIG. 1 illustrates an example enterprise information processing environment 100. The enterprise environment 100 includes a portion of an enterprise environment 110 which includes an intranet 115 which manages and provides access to data 120 and applications 125. Intranet 115 may be accessed by one or more devices comprising a wireless local area network ("LAN") 135 via gateway 130. Wireless LAN 135 may be any type of wireless LAN know to those of skill in the art, and may be proprietary or abide by any of a number of established wireless LAN standards.

Currently, standards bodies for the wireless eBusiness environment are focused on hardware or infrastructure related issues. Examples of such standards bodies include the Wireless Ethernet Compatibility Alliance ("WECA"), the Institute of Electrical and Electronics Engineers ("IEEE"), the Bluetooth Special Interest Group ("SIG") and the Wireless Application Protocol ("WAP") forum.

WECA seeks to attest to the interoperability of products based on the 802.11b specification. WECA certifies such products as Wireless Fidelity (Wi-Fi) compatible. WECA further endorses Wi-Fi as the global wireless LAN standard across all market segments.

IEEE conducts extensive research in technology spanning a broad spectrum. IEEE created the 80211 standard for wireless networks, and is also instrumental in creating security protocols such as Wired Equivalent Privacy (WEP). The IEEE does not provide certifications of any kind for their specifications.

SIG is a volunteer organization run by employees from member companies. Members support a number of working groups that focus on specific areas, such as engineering, qualification and marketing. The member companies build and qualify products under strict qualification procedures with regular testing of products at events sponsored by Bluetooth.

The WAP forum offers a comprehensive certification and interoperability testing program that covers device testing, content verification, and a set of authoring guidelines to assist developers in providing interoperable WAP applications and services.

Figure 2:
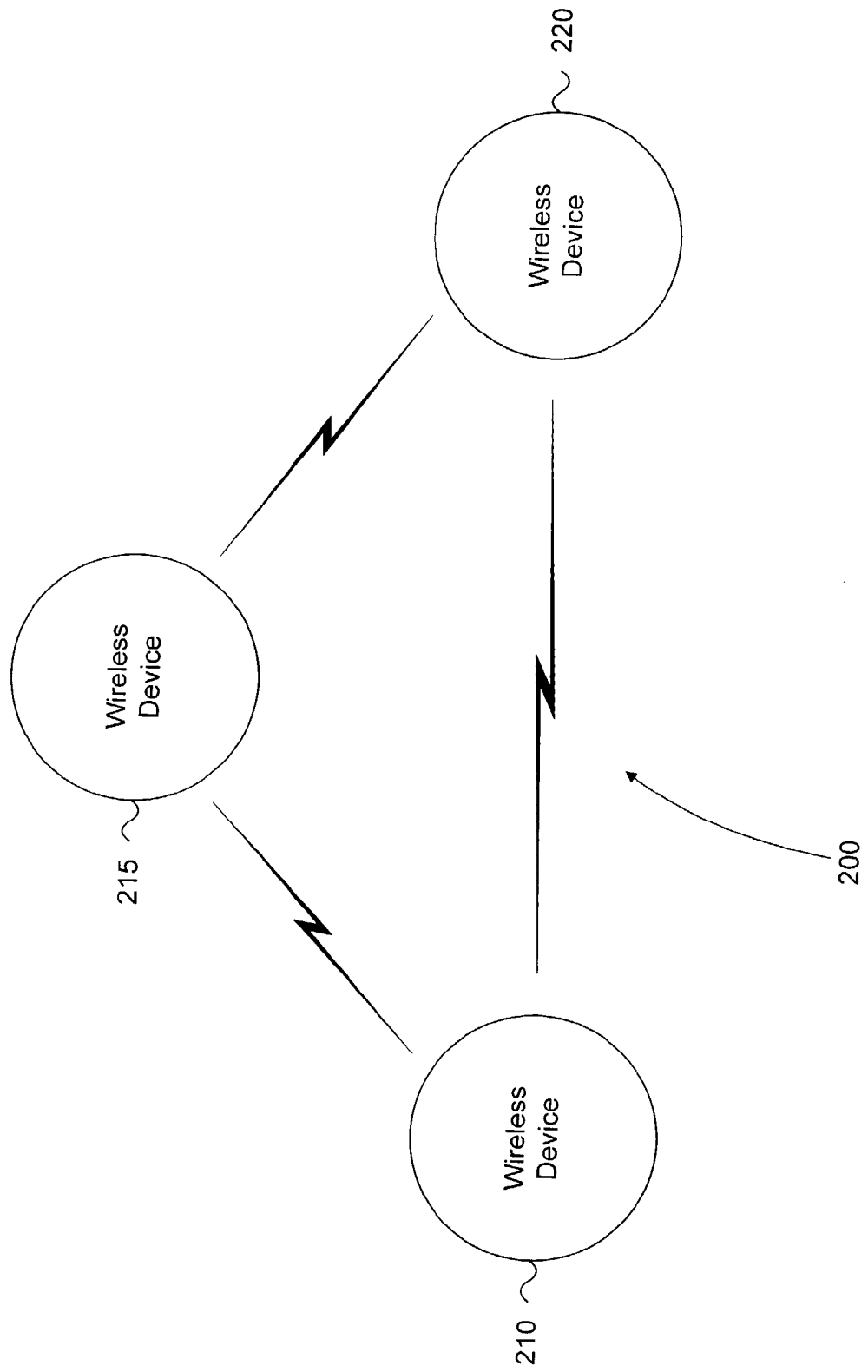
FIG. 2 is a block diagram illustrating a peer-to-peer wireless network.

Wireless LAN 135 may employ any known network architecture, such as for example, a peer-to peer architecture or an infrastructure architecture. As illustrated in FIG. 2, each wireless device or client (210, 215 and 220) in a peer-to-peer wireless network 200 communicates with other devices in the network within a specified transmission range or cell. If a wireless client has to communicate with a device outside the specified cell, a client within that cell must act as a gateway and perform the necessary routing.

Figure 3:
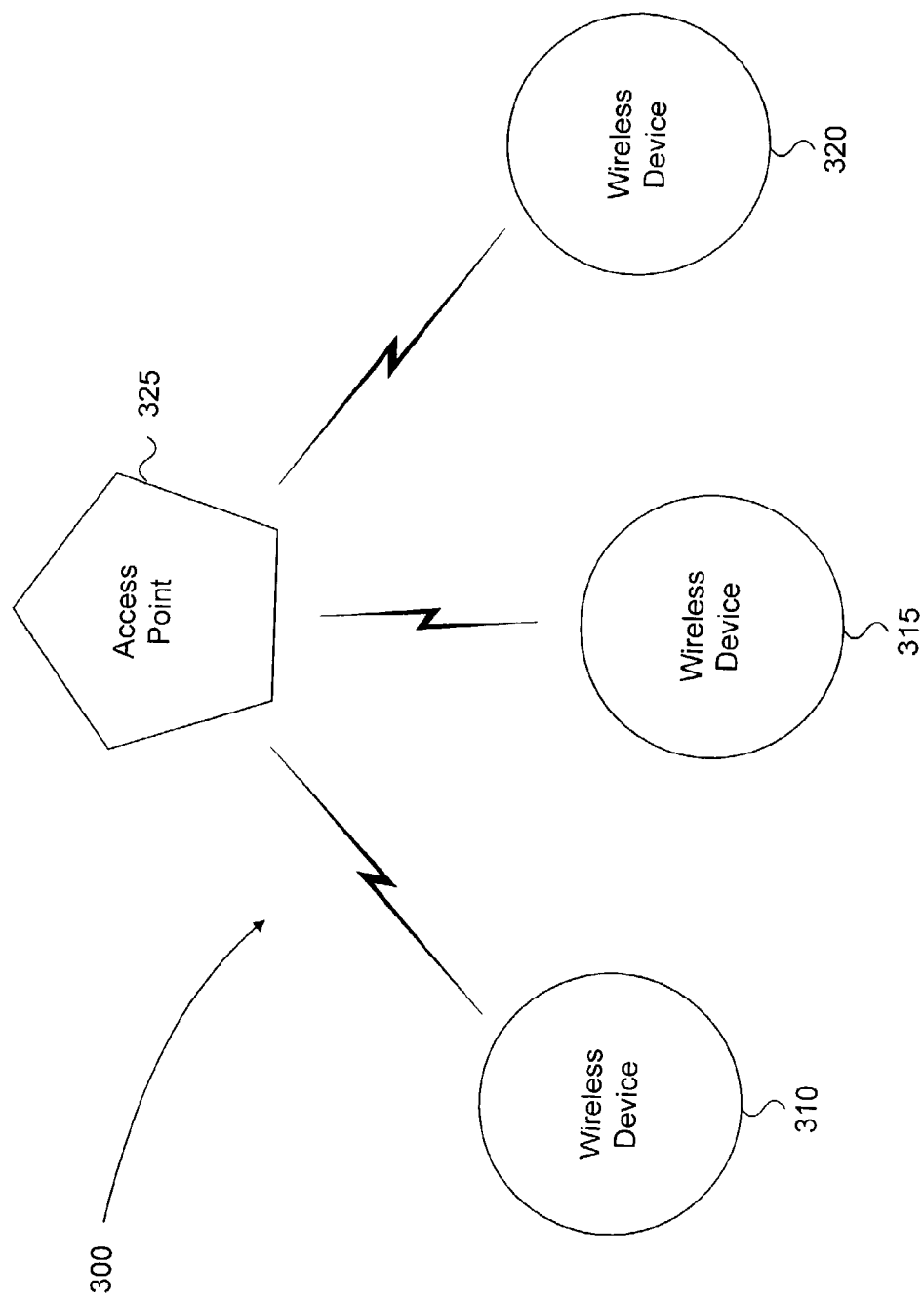
FIG. 3 is a block diagram illustrating a wireless LAN having an infrastructure architecture.

FIG. 3 illustrates a wireless LAN 300 having an infrastructure architecture. In wireless LAN 300, communications between multiple wireless clients 310, 315 and 320 are routed by a central station known as an access point 325. Access point 325 acts as a bridge and forwards all communications to the appropriate client in the network whether wireless or wired. Besides having routing mechanisms, access point 325 also includes as a DHCP server and other features that facilitate wireless communications in a small to large business environment. Residential gateways are similar to access points, but do not have advanced management features required for corporate networks or high-traffic environments. A wireless client is first authenticated, and then associated with an access point before it performs any communications.

Referring back to FIG. 1, the enterprise environment 100 includes a wireless wide-area network ("WAN") 140. Wireless WAN 140 includes wireless devices that are outside the coverage area of a wireless LAN and is supported by a wireless operator 145. WAN 140 may be any type of wireless WAN known to those of skill in the art, and may be proprietary or abide by any of a number of wireless protocols.

Examples of WAN protocols which may be used by WAN 140 include code division multiple access ("CDMA") and global system for mobile ("GSM"). In a CDMA network, A large number of users are able to access wireless channels on demand. CDMA is typically used by digital mobile telephone companies, and the performance is almost 8 to 10 times better than traditional analog cell phone systems. The latest generation of this technology is called 3G and is highly anticipated by many mobile users.

GSM is a wireless platform that provides full voice and data support with worldwide roaming capabilities. The GSM family includes the General Packet Radio Service ("GPRS") platform for delivering internet content on mobile devices, the Enhanced Data-rates for GSM Evolution ("EDGE") platform and the third Generation ("3GSM") platform for delivering mobile multimedia. Some wireless carriers base their offerings on the above-mentioned platforms, leveraging the strengths of the implemented protocol.

Wireless Operator 115 may be any organization or system that provides the hardware and communications infrastructure to enable wireless transmission in a wireless LAN and/or a wireless WAN environment. Typically, wireless operator 145 provides basic wireless phone services, and may offer services to transmit data in various forms.

In this example embodiment, data is transferred between wireless operator 145 and the portion of the enterprise environment 110 via a wireless gateway 150, the internet 155 and a firewall 160.

Important challenges for businesses implementing networks including wireless devices relate to wireless network management and mobile device management. The components that make up a wireless infrastructure include the wired components such as servers, companion desktops, and access points, for example. These components should be effectively monitored and managed to maintain an productive work environment. With a variety of mobile devices proliferating throughout an enterprise, it is important to secure, manage and monitor the use of these devices. Mobile devices such as PDAs, cell phones, and laptops, for example, as well as the assets stored on them, should be secured and managed. It is important to consider that a large part of the wireless infrastructure is actually wired. All the enterprise assets within the existing infrastructure may be connected through a wired Intranet, which is then connected to access points that provide wireless access to mobile devices.

Wireless Network Management Considerations

According to the present application, certain systems and methods for managing a wireless network increase performance and allow an administration team to respond to issues quickly. In addition to providing a real-time view of the wireless network, a management solution should also provide a future view, so that proactive measures can be taken to prevent problems before they occur. Important considerations in wireless network management include:

- Discovery and Security of Access Points: The points of access to the wireless network should be known, controlled, and accounted for. Because access points are inexpensive and easily installed, individual employees or departments may purchase one and setup their own unauthorized wireless network. Being vulnerable in their default configurations, unauthorized access points often present security breaches in the network. In current networks, unauthorized access points may be added to a network, but may remain undiscovered, thereby causing security measures to be overlooked.
- Access Point Topology: The number of mobile devices concurrently supported by prior art access points vary from model to model. Enterprises should know how many access points are needed to support their wireless users, and the access points should be placed at the appropriate geographic locations to maximize coverage. Good access may also depend on physical line of sight placement of the access points, which could be a problem in certain environments, such as buildings with interior offices, for example.
- Fault and Performance Management: Like most hardware components, access points have a probability to fail. In addition, due to certain limits on the number of concurrent users, it is important to monitor capacity and usage so that measures can be taken to provide additional access points as needed. Administrators should to be notified when policies are breached, or if a component fails. The management solution should support the different standards like RMON, MIB-II, and proprietary MIBs to effectively monitor the status of these devices.
- Privacy and Security: Wireless networks are one of the easiest to hack into and prior art security measures are not adequate to prevent this intrusion. There are several vulnerabilities in the WEP security features provided in the 802.11b standard. The goal of WEP is to provide data confidentiality in wireless networks at the same level as in a network that is wired. However, despite having well-known encryption mechanisms, namely the RC4 cipher, WEP is vulnerable to both passive and active attacks. This vulnerability opens up a wireless network for malicious parties to eavesdrop and tamper with wireless transmissions.
- Virus Protection: Prior art enterprise anti-virus solutions may protect servers, desktops, and laptops, but the prior art has not provided a solution protecting an enterprise server against viruses that infect the enterprise by using mobile devices as carriers. Viruses may even attach themselves to access points and sniff confidential transmissions.
- Enterprise Management for Mobile Administrators: Network administrators should have the ability to manage the enterprise through mobile devices. Administrators should have access to all appropriate management tools through their mobile devices so they can be more efficient while on the move.

The present application recognizes that it is desirable to manage the wired and wireless infrastructures in a unified or integrated manner. In this way, organizations can more readily isolate fault and performance problems, which may adversely affect the quality of service. Management solutions with both wired and wireless support can deliver sophisticated root-cause analysis and end-to-end service level management.

Mobile Device Management Considerations

As the movable part of the wireless enterprise, devices like laptops, PDAs, and other wireless devices should be managed and secured with effective control without restricting the user's freedom to leverage the benefits of being mobile. Important considerations regarding mobile device management include:

- Device Discovery: The enterprise administrator should know what mobile devices are being used on the network. According to the present application, tracking and maintaining an inventory of all approved devices can prevent unauthorized access to the wireless network.
- Software Delivery: Administrative tools should ensure that all mobile devices run the correct versions of the corporate applications. For example, the latest virus signatures should be updated on the mobile devices to maintain security. When a device is replaced or replicated, the administrator should have a way to easily transfer the authorized corporate software onto the user's mobile device to maintain business continuity.
- Asset Management: Mobile devices that are meant for corporate use should be protected against unauthorized applications and data. Administrators should maintain a software and hardware inventory of each mobile device and enforce the proper policies.
- Device Security: Mobile devices should include sophisticated security features so that if they are lost, misplaced, or stolen, they can be easily located and disabled before confidential information goes into the wrong hands.
- Device Identification and Tracking: Many mobile devices do not have unique names or identifiers, making it hard for administrators to track and account for all the wireless devices in use. Many employees may be using devices that are not supported by the enterprise and might become a security liability. Therefore, approved mobile devices should be extended to include the ability to support a unique identifier.

Virus Protection: Laptops and some Windows-based mobile devices are susceptible to viruses that run on PCs and require anti-virus protection. Although there are no major viruses yet presently reported for most mobile devices, it is possible that new viruses may be propagated that specifically infect and destroy files and information on mobile devices. Not only should the device be protected from virus attacks, but it also should not become a carrier for viruses that lay dormant on the wireless device and infect the companion PC on synchronization or other machines on the LAN.

Data Preservation: Information on wireless laptops and other mobile devices should be backed up regularly. In the event of data loss, restoring the data should not be complicated.

The present application recognizes that wireless systems do not operate independent of wired infrastructure, they are integrated into the IT infrastructure. Therefore, managing the wireless infrastructure should be conducted in the context of the overall enterprise infrastructure. Prior art solutions designed specifically for and limited to wireless networks do not effectively integrate wireless device management functions with monitoring the rest of the enterprise to promptly identify and resolve problems. Wireless management solutions should be integrated, comprehensive, and reliable. Such a comprehensive solution allows network administrators to manage and secure their wireless network infrastructure and enables them to improve management productivity and maintain high levels of service for wireless applications.

According to one aspect of the present application, devices such as access points and mobile devices, in a wireless network are automatically detected and identified. Such automatic detection and identification ensures that all the components in the wireless network, including servers, desktop computers, wireless access points and mobile devices, for example, are accounted for. A topological map of their physical and logical connections is created. Using this topological map, network administrators can easily detect the addition of unauthorized components in the network and take the appropriate actions to rectify a particular situation.

Figure 4:
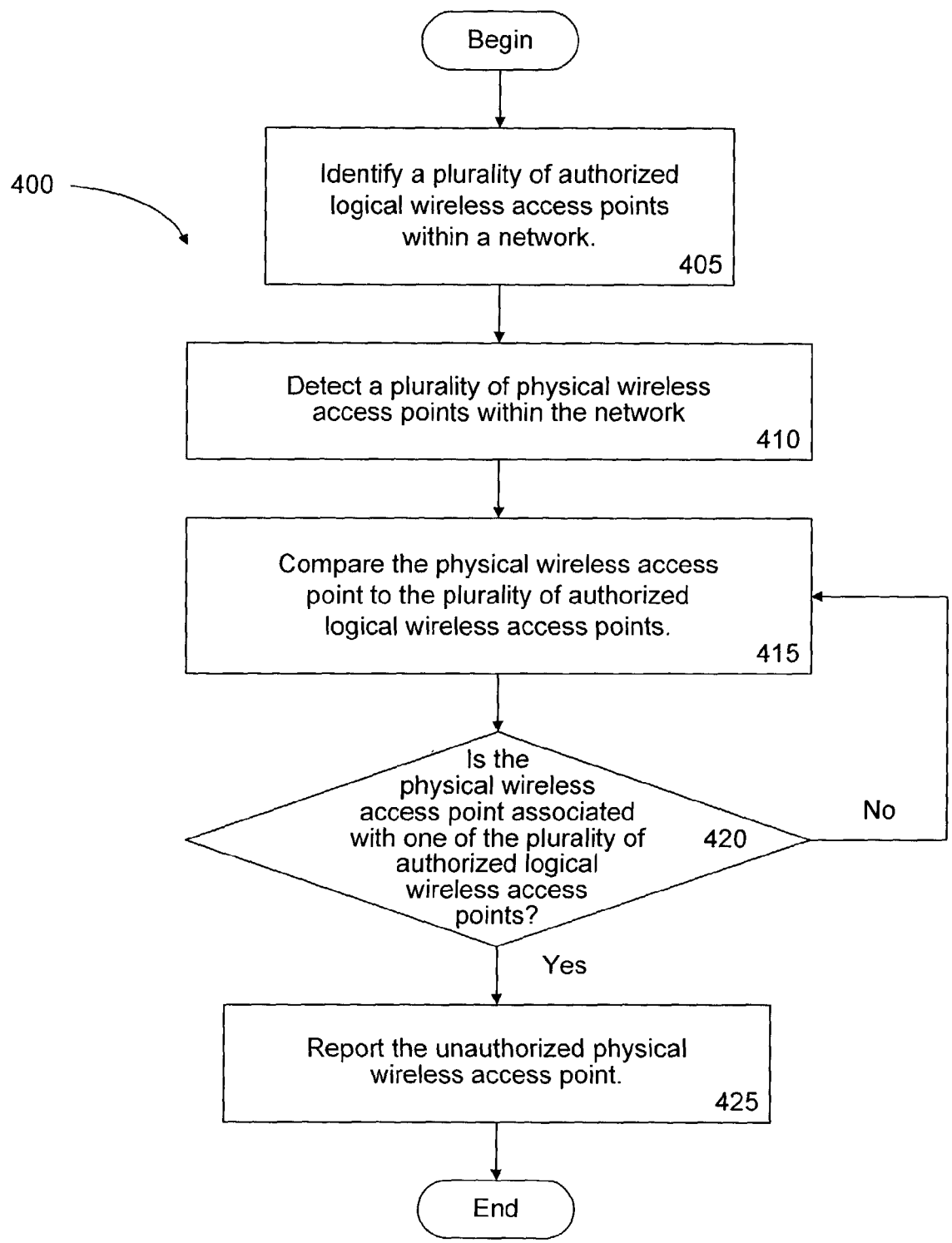
FIG. 4 is a flow chart illustrating an example methodology for automatically discovering wireless access points in a network.

In one example embodiment, an integrated network management solution may automatically detect and identify wireless devices in a network. FIG. 4 is a block diagram illustrating an example methodology for automatically discovering wireless access points, such as wireless access point 325, in a network such as network 100.

At block 405, a plurality of authorized logical wireless access points within a network are identified. Each physical access point may provide one or more wireless devices access to the network. At block 410, the network detects a plurality of physical wireless access points within the network. At block 415, each physical wireless access point is compared to the plurality of authorized logical wireless access points to determine whether the physical wireless access point is an authorized access point for the network. At block 420, if the physical access point is not authorized, the unauthorized access point is reported at block 425 to a network administrator or another responsible party so that corrective action may be taken.

The information collected using methodology 400, along with information about other devices including wireless devices using the physical access points, may be used to create a map of the topology of the network. Once the components in the wireless infrastructure are discovered, the resulting map may be used to construct a more efficient topology to improve the performance of the wireless network.

Wireless networks have a hierarchical topology and each mobile device is associated with the access point it uses to connect to the network. As users roam from one access point to the other, the topology may change to reflect this movement. In this manner, mobile devices on the wireless network can be tracked and their location may be mapped accordingly.

The dynamic nature of the wireless medium presents certain challenges to managing faults and performance of devices on the wireless network. In addition to the standard set of metrics that are common to all wired networks, wireless networks have an additional set of metrics related to the wireless medium itself that may be monitored. Some of these metrics include transmit power, interference, retransmission, fragmentation counts, failure counts, and change in transmission speed. The solutions of the present application provide extensive monitoring capabilities for RMON-I, RMON-II and MIB-II device configurations, which are adopted by many access points presently available. Metrics from vendor proprietary MIBs may also be collected.

Administrators may be alerted when an access point shuts down or when the normal operations are disrupted. Using root-cause analysis, network management applications may determine whether a network component failed or if the device itself has problems. Custom policies may also be created to ensure that a wireless network component is performing efficiently.

In addition to managing faults and performance, it is important to manage access to the wireless devices and to the network. In one embodiment, users trying to log on to the wireless network may be authenticated and any unusual activity may be detected. Accordingly, intruders may be prevented from gaining access to sensitive information. Security policies may be defined and enforced and appropriate authorities may be notified when a policy is breached.

Figure 5:
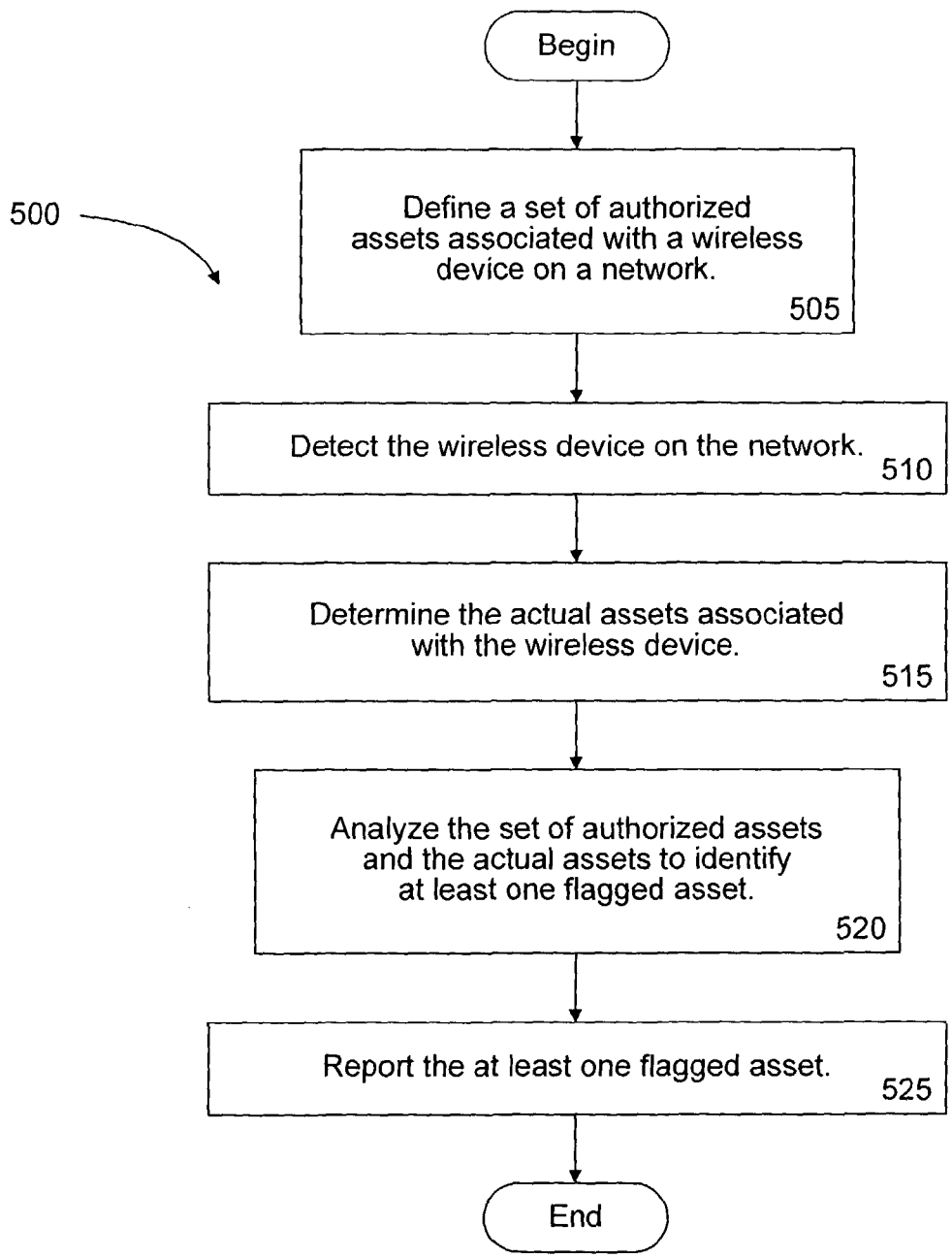
FIG. 5 is a flow chart illustrating an example methodology for managing assets of a wireless device in a network.

Wireless device asset management is another important area of focus for wireless network management. In one example embodiment, an integrated network management solution may assets of a wireless device in a network. FIG. 5 is a block diagram illustrating an example methodology for managing the assets of a wireless network device.

At block 505, a set of authorized assets are defined. The assets are associated with a wireless device on a network. The assets may include hardware or software, and the asset definition may be specific enough to identify a particular version of software or a particular revision level of hardware. Any hardware and software assets on the mobile device can be managed. At blocks 510 and 515, the network management application detects the wireless device on the network and determine the assets actually associated with or residing on the detected wireless device.

At block 520, the set of authorized assets and the assets actually residing on the wireless device are analyzed to identify at least one flagged asset. For example, a flagged asset may be a missing or outdated software component, an unauthorized hardware component or a damaged hardware or software component.

At block 525, any flagged assets are reported, for example, to a network administrator. Methodology 500 enables an inventory of assets to be maintained and any breach of policy to be detected and reported so that it may be rectified either automatically or manually. This prevents the wireless device from being out of compliance with network policies or otherwise misused.

Using methodology 500, enterprise software may be delivered to mobile devices either through a cradled unit or directly over the wireless network. This ensures uniformity and that all mobile users have the latest versions of software on their devices for higher productivity and simplified support.

Figure 6:
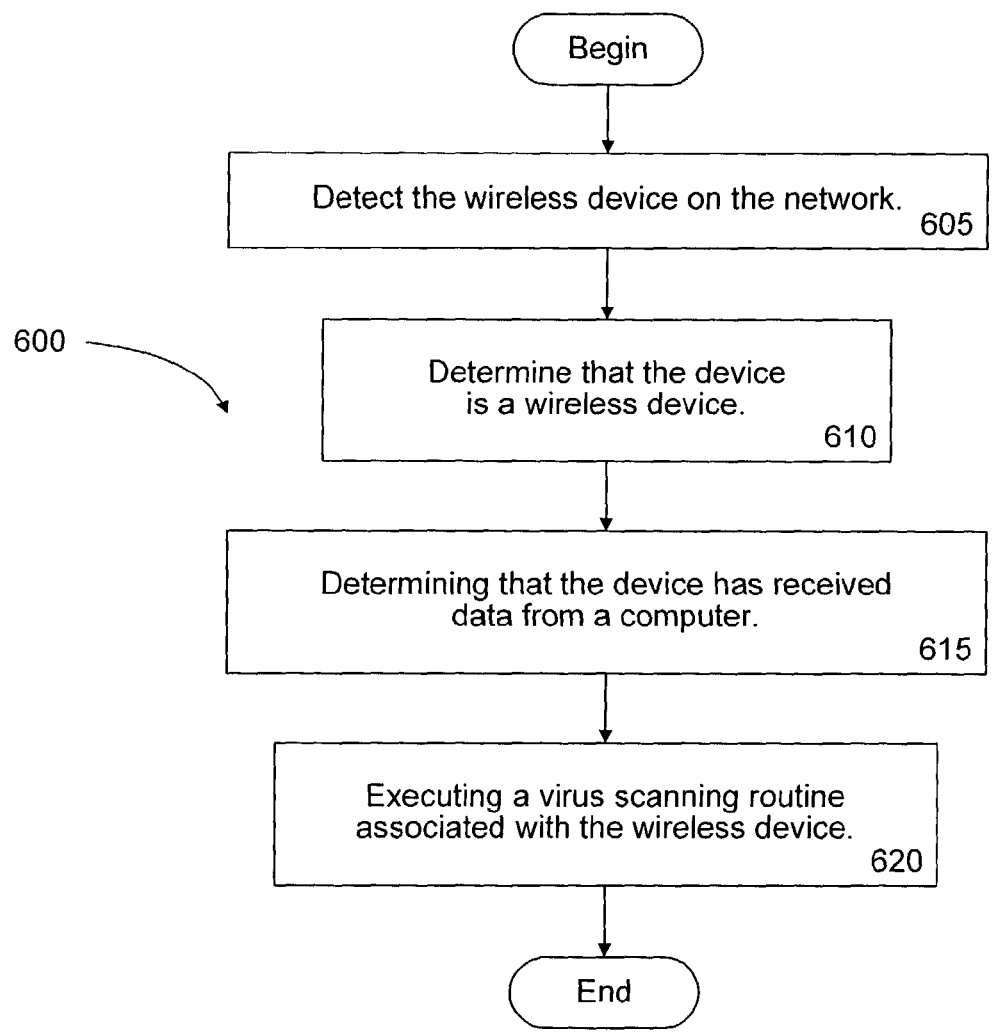
FIG. 6 is a flow chart illustrating an example methodology for maintaining the security of a wireless device in a network.

FIG. 6 is a flow chart illustrating an example methodology 600 for maintaining the security of a wireless device in a network. At blocks 605 and 610, the network detects a device and determines that the device is a wireless device. At block 615, the network determines that the device has recently received data from a computer which may be infected with a computer virus. At block 620, the network initiates execution of a virus scanning routine associated with the wireless device.

A light footprint antivirus specially constructed for mobile devices may be used to guard the network from virus attacks. Virus scans may be conducted whenever the wireless device synchronizes with or downloads information from a companion PC. Of course, on-demand scans may be conducted anytime. Viruses for PCs that do not affect mobile devices may also detected, thus preventing the device from being a carrier.

Figure 7:
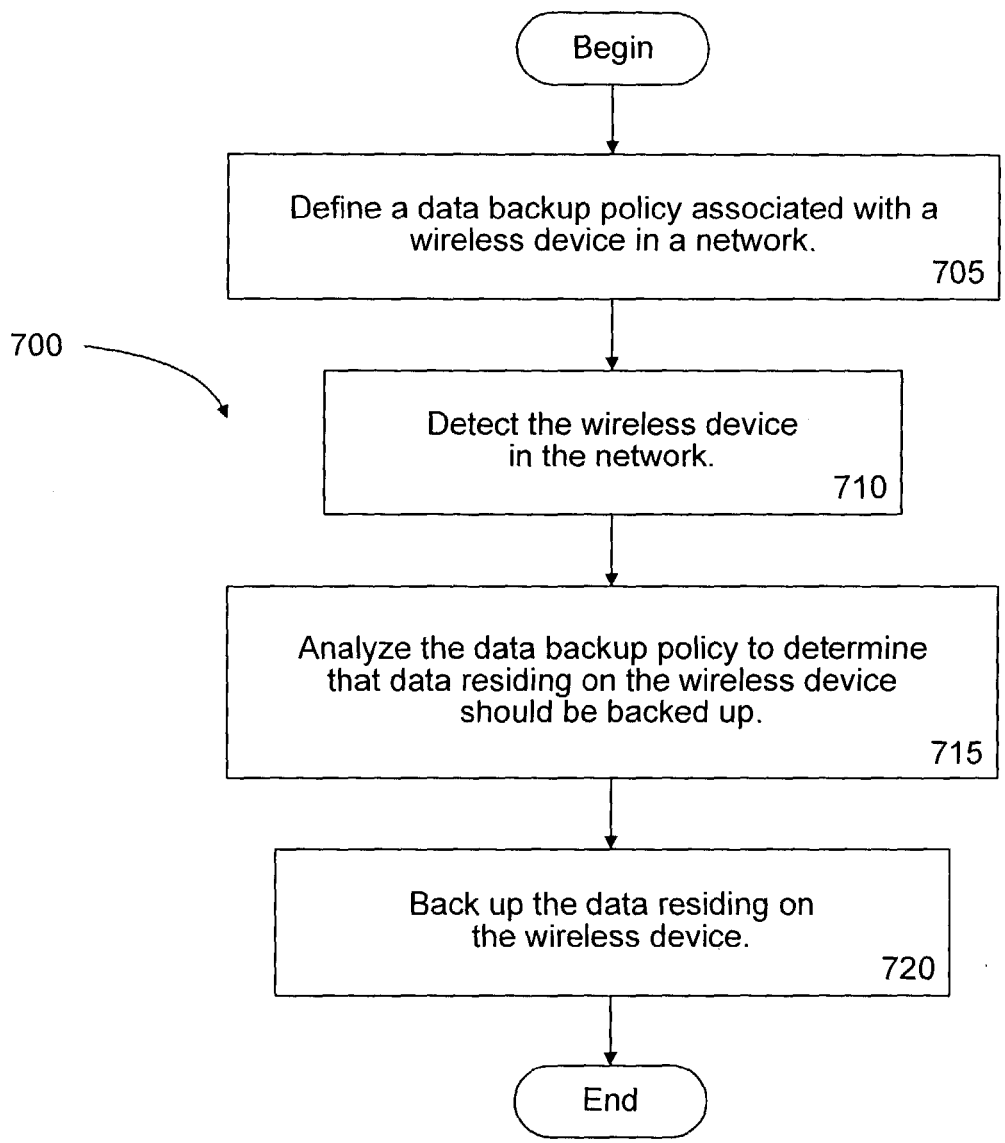
FIG. 7 is a flow chart illustrating an example methodology for backing up data of a wireless device in a network.

FIG. 7 is a flow chart illustrating an example methodology 700 for initiating a backup of data of a wireless device in a network. A backup policy is defined for the wireless device at block 705. The network detects the wireless device at block 710 and the data backup policy is analyzed to determine that data residing on the wireless device should be backed up (715). At block 720, a data backup routine is processed.

What has been described above includes several examples. It is, of course, not possible to describe every conceivable combination of components or methodologies for purposes of describing the systems, methods, and computer readable media associated with managing wireless devices in an enterprise. However, one of ordinary skill in the art may recognize that further combinations and permutations are possible. Accordingly, this application is intended to embrace such alterations, modifications, and variations that fall within the scope of the appended claims. Furthermore, to the extent that the term "includes" is employed in the detailed description or the claims, such term is intended to be inclusive in a manner similar to the term "comprising" as that term is interpreted when employed as a transitional word in a claim.

What is claimed is:

1. A method for managing a wireless device in a network, the method comprising:
   identifying a plurality of authorized logical wireless access points within a network;
   detecting a plurality of physical wireless access points within the network;
   determining, by a computer, for each of the plurality of physical wireless access points, whether the physical wireless access point is associated with one of the plurality of authorized logical wireless access points; and
   reporting each physical wireless access point that is not associated with an authorized logical wireless access points.

2. The method of claim 1, further comprising:
   detecting a plurality of wireless devices, including determining the associated physical wireless access point; and
   creating a topological map of the network reflecting the relationship between each of the plurality wireless devices and the respectively associated physical wireless access point.

3. The method of claim 1, further comprising:
   defining a preferred metric value associated with a wireless device;
   detecting the wireless devices, including determining an actual metric value; and
   comparing the determined metric value to the preferred metric value to determine whether the wireless device is operating improperly; and
   reporting whether the wireless device is operating improperly.

4. The method of claim 3, wherein the preferred metric is a measurement of transmission power.

5. The method of claim 3, wherein the preferred metric is a measurement of acceptable interference.

6. The method of claim 3, wherein the preferred metric is a fragmentation count.

7. The method of claim 3, wherein the preferred metric is a transmission speed.

8. The method of claim 3, wherein the preferred metric is a failure count.

9. The method of claim 1, further comprising:
   defining a security policy associated with a wireless device;
   detecting the wireless device, including obtaining security information associated with the device;
   determining that the security information violates the security policy; and
   reporting a security violation.

10. The method of claim 9, wherein the security policy defines an authorized user ID/password combination, and wherein the security information is an unauthorized user ID/password combination.

11. The method of claim 9, wherein the security policy defines an authorized wireless device identifier, and the security information is an unauthorized wireless device identifier.

12. A method for managing a wireless device in a network, the method comprising:
   defining a set of authorized assets associated with a wireless device on a network;
   detecting the wireless device on the network;
   determining the actual assets associated with the wireless device;
   analyzing, by a computer, the set of authorized assets and the actual assets to identify at least one flagged asset; and
   reporting the at least one flagged asset.

13. The method of claim 12, wherein analyzing includes determining whether each actual asset is part of the set of authorized assets; and
   wherein each flagged asset is an actual asset that is not part of the set of authorized assets.

14. The method of claim 12, wherein analyzing includes determining whether each authorized asset is an actual asset; and
   wherein each flagged asset is an authorized asset that is not an actual asset.

15. The method of claim 12, wherein an authorized asset is a software application having a version identifier.

16. The method of claim 12, wherein an authorized asset is a hardware device having an identifier.

17. The method of claim 12, wherein the flagged asset is a software application, and the method further includes:
   delivering the software application to the wireless device.

* * * * *